(12) United States Patent
Keegan

(10) Patent No.: US 6,830,844 B2
(45) Date of Patent: Dec. 14, 2004

(54) REVERSING AIR FLOW ACROSS A CATHODE FOR A FUEL CELL

(75) Inventor: Kevin R. Keegan, Hilton, NY (US)

(73) Assignee: Delphi Technologies, Inc., Troy, MI (US)

( * ) Notice: Subject to any disclaimer, the term of this patent is extended or adjusted under 35 U.S.C. 154(b) by 475 days.

(21) Appl. No.: 10/108,166

(22) Filed: Mar. 27, 2002

(65) Prior Publication Data
US 2003/0186102 A1 Oct. 2, 2003

(51) Int. Cl.⁷ ................................................ H01M 2/00
(52) U.S. Cl. ........................ 429/34; 429/20; 429/19; 429/24; 429/26; 429/39; 429/13; 429/17; 180/65.3; 180/165
(58) Field of Search .......................... 429/13, 17, 19, 429/20, 24, 26, 34, 39; 180/65.3, 165

(56) References Cited

U.S. PATENT DOCUMENTS 6,186,254 B1 * 2/2001 Mufford et al. ............ 180/65.3
6,321,145 B1   11/2001 Rajashekara
6,393,851 B1 * 5/2002 Wightman .................... 62/225
6,423,896 B1   7/2002 Keegan
6,455,185 B2   9/2002 Bircann et al.
6,485,852 B1   11/2002 Miller et al.
6,509,113 B2   1/2003 Keegan
6,551,734 B1 * 4/2003 Simpkins et al. ............ 429/26
6,562,496 B2   5/2003 Faville et al.
6,608,463 B1   8/2003 Kelly et al.
6,613,468 B2   9/2003 Simpkins et al.
6,613,469 B2   9/2003 Keegan
6,627,339 B2   9/2003 Haltiner, Jr.
6,630,264 B2   10/2003 Haltiner, Jr. et al.

* cited by examiner

Primary Examiner—Bruce F. Bell
(74) Attorney, Agent, or Firm—Paul L. Marshall

(57) ABSTRACT

A fuel cell assembly having means for providing tempered air to, and removing spent air from, air-flow passages across the cathode. The air flow path includes means for reversing the direction of flow across the cathode periodically to reverse the roles of the leading and trailing edges of the cathode to prevent temperature differences across the cathode from exceeding 200° C., and thus to prevent damage to the cathode from thermally-induced stresses during startup heating and steady-state cooling.

16 Claims, 5 Drawing Sheets

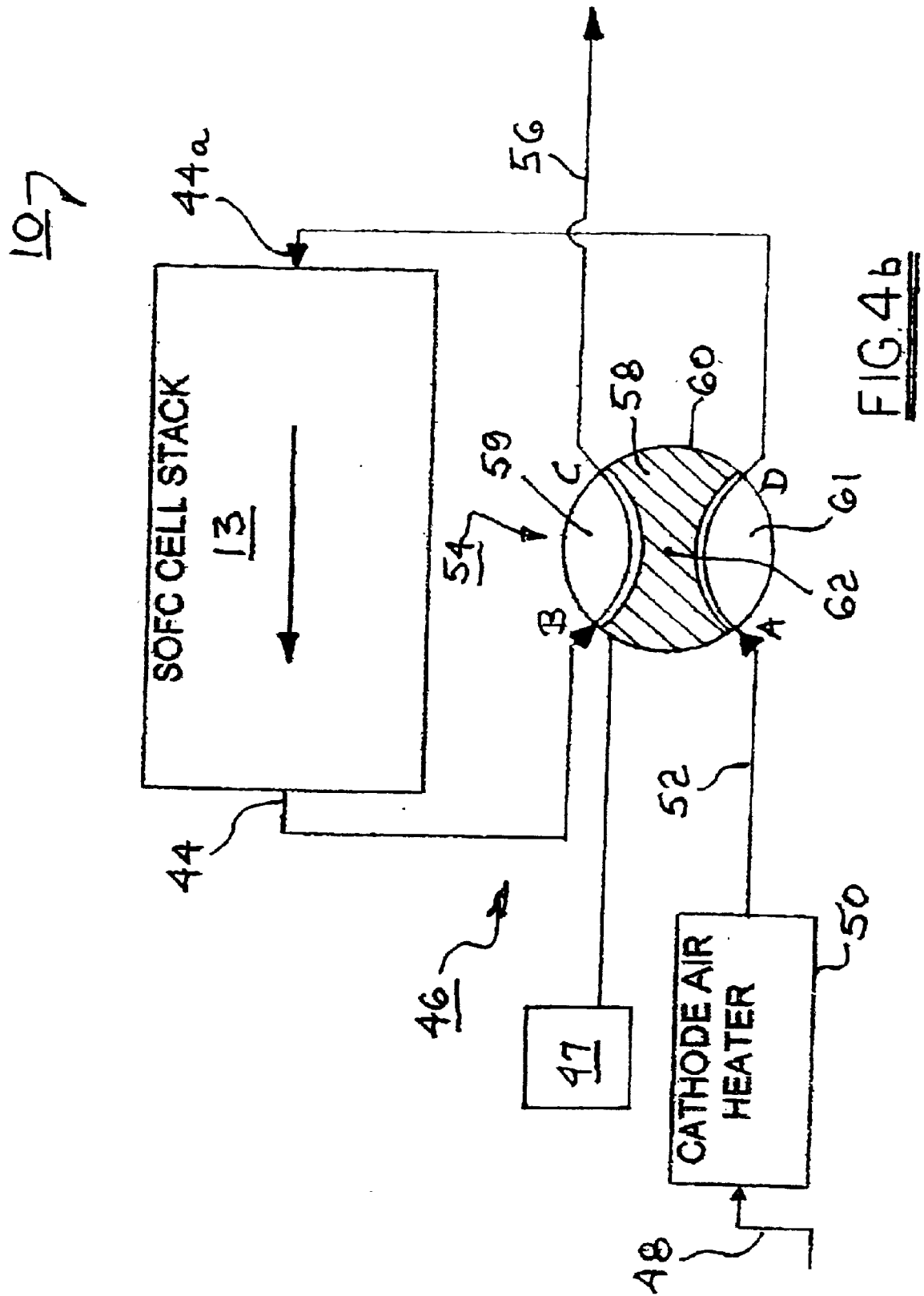

REVERSING AIR FLOW ACROSS A CATHODE FOR A FUEL CELL

TECHNICAL FIELD

The present invention relates to hydrogen/oxygen fuel cells; more particularly, to stacks comprising a plurality of individual cells connected by interconnect elements; and most particularly, to a fuel cell assembly wherein internal temperature, especially temperature of the cell itself, is modulated by periodic reversal of the direction of air flow across the cathode.

BACKGROUND OF THE INVENTION

Fuel cells which generate electric current by controllably combining elemental hydrogen and oxygen are well known. In one form of such a fuel cell, an anodic layer and a cathodic layer are deposited on opposite surfaces of a permeable electrolyte formed of a ceramic solid oxide. Such a fuel cell is known in the art as a "solid oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode where it is ionized. The oxygen ions diffuse through the electrolyte and combine with hydrogen ions to form water. The cathode and the anode are connected externally through the load to complete the circuit whereby electrons are transferred from the anode to the cathode. When hydrogen is derived from "reformed" hydrocarbons, the reformate gas includes CO which is converted to $CO_2$ at the anode. Reformed gasoline is a commonly used fuel in automotive fuel cell applications.

An SOFC operates at a temperature, typically, of about 750° C. or higher. The reaction is exothermic, so the SOFC requires active cooling during operation, typically by flowing cooler air across the cathode. Conversely, at startup from ambient temperatures, the SOFC requires heating for the catalytic electrolyte to begin ionizing oxygen, typically by flowing heated air across the cathode.

A serious problem arises in thermal management within an SOFC. Because the cathode is highly vulnerable to cracking and consequent failure from thermal stresses, temperature differences greater than about 200° C. are unacceptable. Air flows through a fuel cell from introduction at an upstream edge of the cathode to discharge across a downstream edge, undergoing temperature change during such flow. Thus, the cathode experiences an inherent temperature difference between the upstream and downstream edges, and between itself and the temperature-modulating air. Since the permissible temperature difference ($\Delta T$) between the temperature of the heating air and the internal temperature of the SOFC is limited, long warmup times on the order of several hours typically are required, whereas for automotive uses, startup times of about ten minutes or less are highly desirable.

Similarly, large volumes of cooling air are required during operation because the permissible $\Delta T$ for cooling is limited. Providing such large volumes is parasitically consumptive of power being generated by the fuel cell, thereby reducing the net power output thereof, since it requires a relatively large blower having a relatively large electric motor.

What is needed is a means for providing a higher difference between the average temperature of cathode entry air and the average temperature of cathode exit air for heating and cooling a fuel cell cathode to shorten the startup time and to reduce the volume of cooling air required.

It is a principal object of the present invention to provide an improved thermal management method and apparatus for an SOFC wherein startup may be achieved in a short period of time.

It is a further object of the invention to provide such a method and apparatus wherein lower volumes of cooling air are required.

SUMMARY OF THE INVENTION

Briefly described, a fuel cell assembly in accordance with the invention has means for providing tempered air to, and removing spent air from, air-flow passages across the cathode(s). The air flow path includes means for reversing the direction of flow across the cathode(s) periodically to reverse the roles of the leading and trailing edges of the cathode(s) to prevent temperature differences across the cathodes(s) from exceeding 200° C., and thus to prevent damage to the cathode(s) from thermally-induced stresses during startup heating and steady-state cooling.

BRIEF DESCRIPTION OF THE DRAWINGS

These and other features and advantages of the invention will be more fully understood and appreciated from the following description of certain exemplary embodiments of the invention taken together with the accompanying drawings, in which:

FIG. 4b is a view like that shown in FIG. 4a, showing flow of air through the fuel cell in a second direction opposite to the first direction.

DESCRIPTION OF THE PREFERRED EMBODIMENTS

Figure 1:
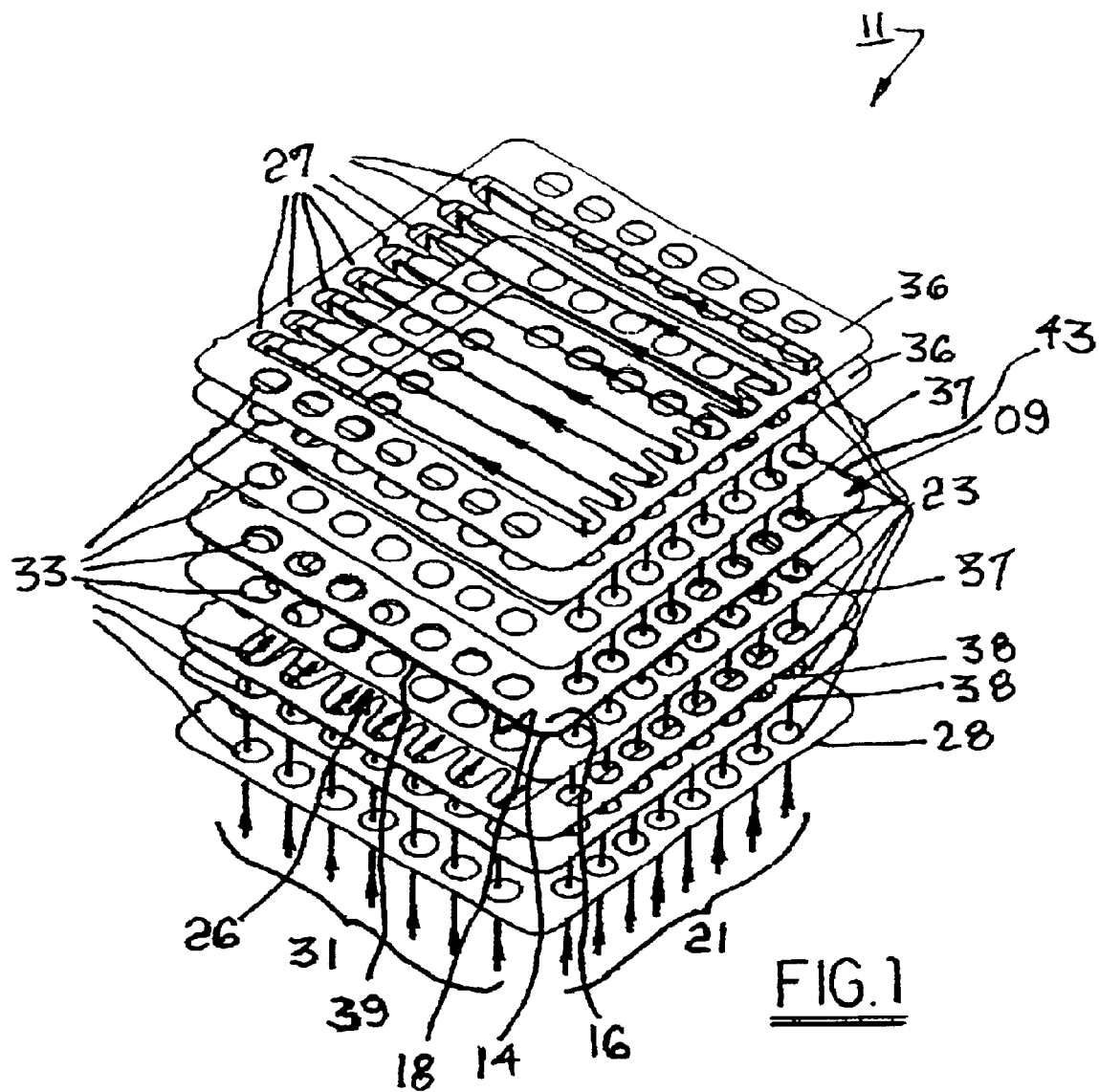
FIG. 1 is an exploded isometric view of a single solid oxide fuel cell, showing the various elements and the flow paths of fuel and oxygen through the cell.
Figure 2:
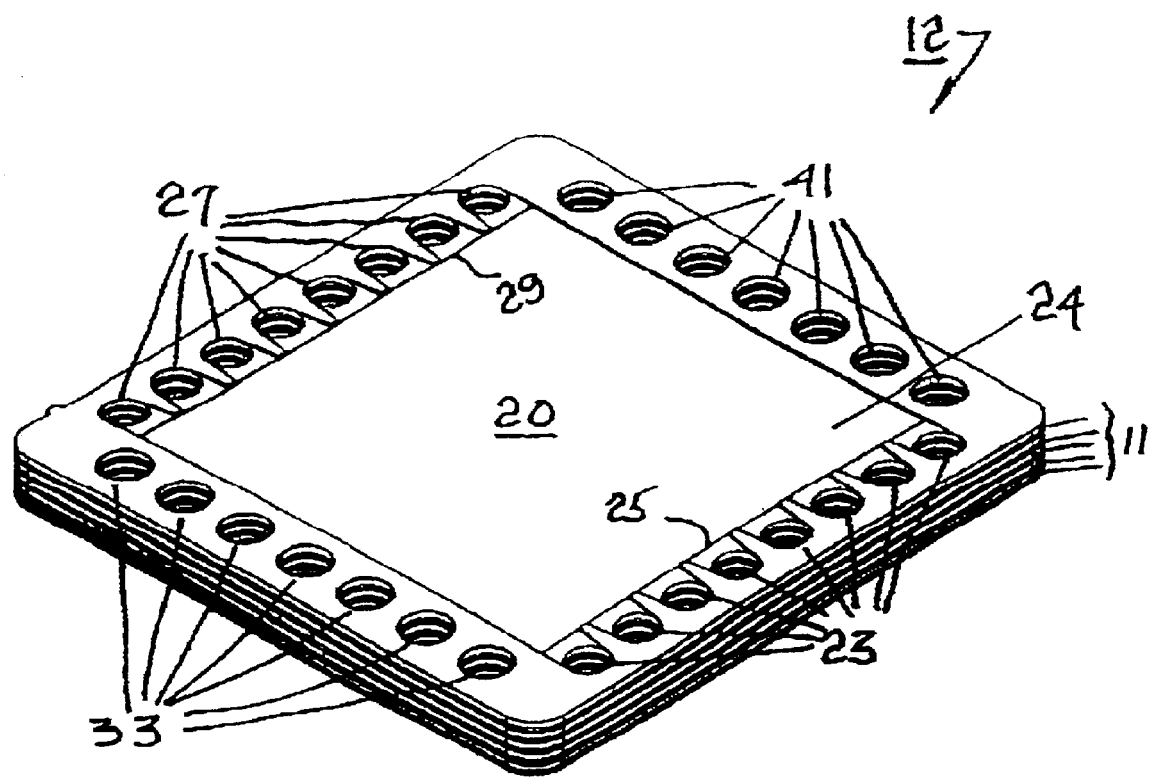
FIG. 2 is an isometric view of a fuel-cell stack comprising five cells like the cell shown in FIG. 1.

Referring to FIGS. 1 and 2, an individual fuel cell 11 includes a multilayer element 09 comprising an electrolyte 14 (E) having an anode 16 or positive element (P) deposited on a first surface thereof and a cathode 18 or negative element (N) deposited on a second surface thereof. Thus, element 09, which is the actual "fuel cell," is known in the art by the acronym PEN. Passage 24 for flow of fuel 21 across the free surface 20 of anode 16 is provided by first cut-out spacers 36 sealed to anode 16 by peripheral seal 37, and passage 26 for flow of air 31 across the free surface of cathode 18 is provided by second cut-out spacers 38 sealed to cathode 18 by another peripheral seal 37. Fuel 21, typically in the form of hydrogen or reformate gas, is provided at a first edge 25 of anode surface 20 via supply conduits 23 formed in each element and is removed via exhaust conduits 27 provided at a second and opposite edge 29 of anode surface 20. Oxygen, typically in the form of air, is provided via supply conduits 33 to passages 26 at a first edge 39 of cathode 18 and is removed via exhaust conduits 41 at a second and opposite edge 43 of cathode 18.

Figure 3:
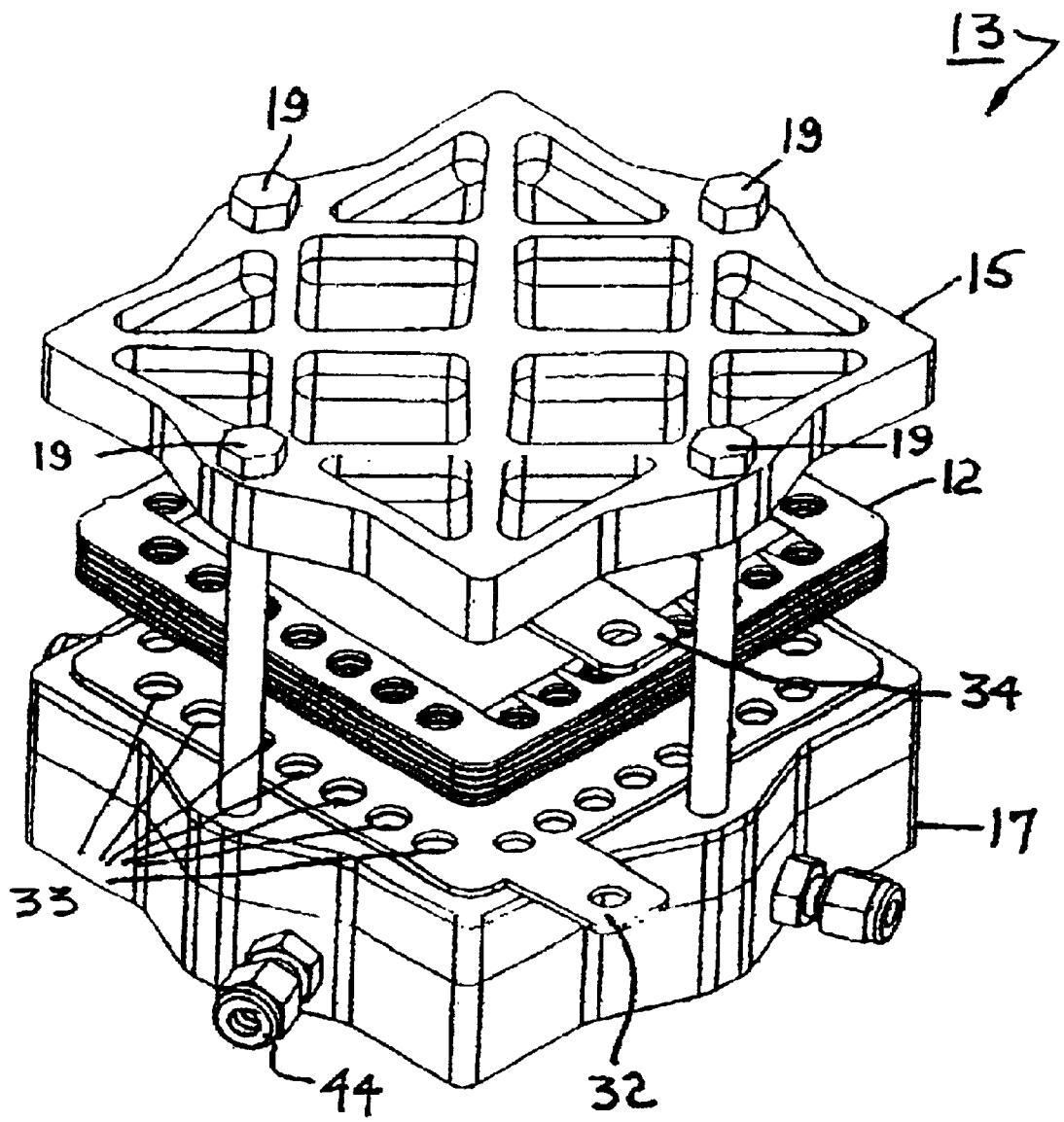
FIG. 3 is an isometric view like that shown in FIG. 2, partially exploded, showing the addition of current collectors, end plates, and bolts to form a complete fuel cell stack ready for use.

Referring to FIG. 3, a plurality of fuel cells 11 may be stacked together to form a stack 12, five such cells being shown in FIG. 2. In a complete working fuel cell 13, stack 12 is sandwiched between an anodic current collector 34 and a cathodic current collector 32 which in turn are sandwiched between a top plate 15 and a gas-manifold base 17, the entire assembly being bound together by bolts 19 extending through bores in top plate 15 and threadedly received in bores in base 17. Air is provided to base 17 for supply to conduits 33 via a first connector 44.

Figure 4A:
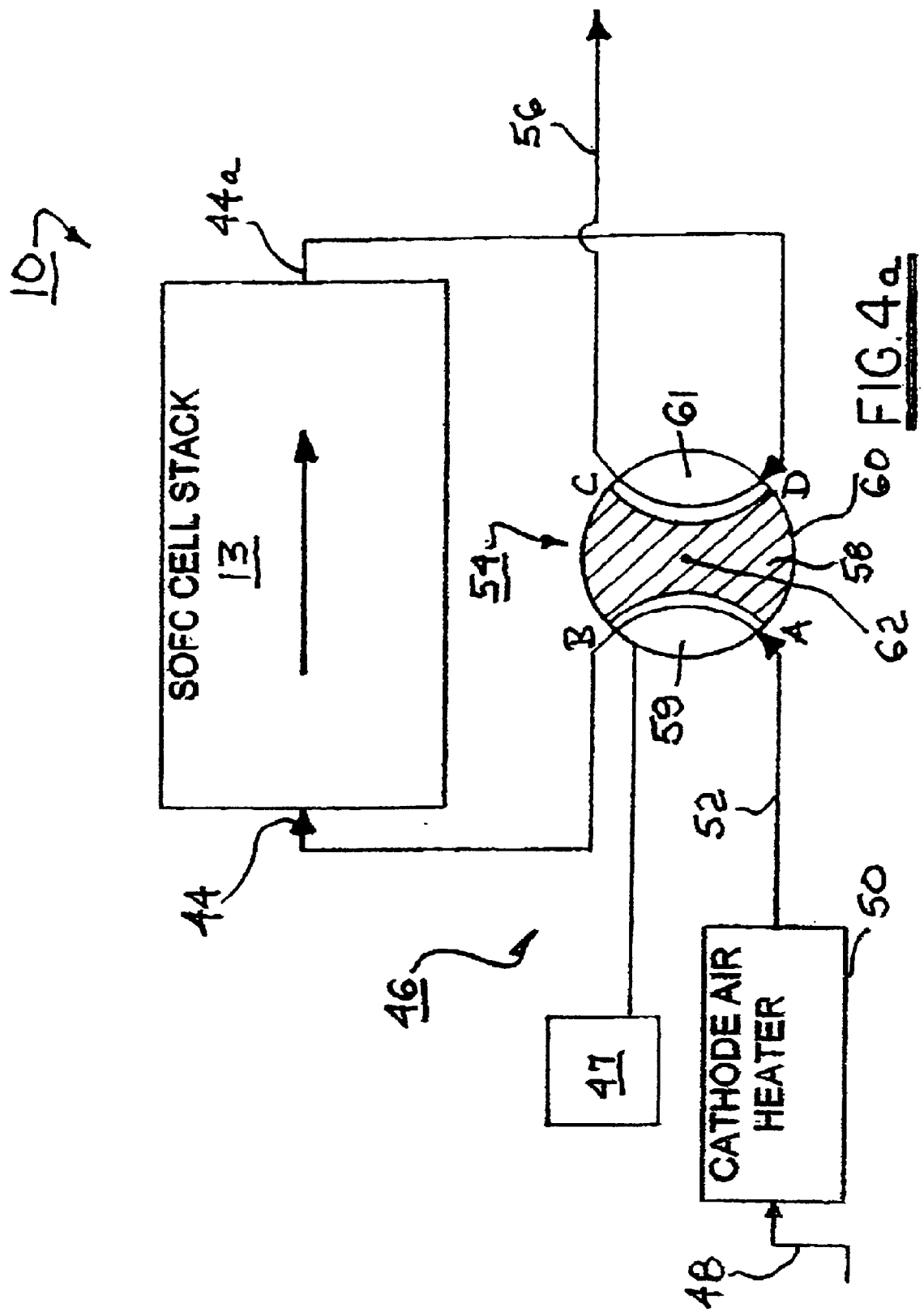
FIG. 4a is a schematic view of a fuel cell assembly including tempering apparatus, showing flow of air through the fuel cell in a first direction.

Referring to FIG. 4a, an air tempering and flow control system 46 for supplying combustion air and thermal maintenance of an SOFC stack 13 in accordance with the invention is connected across the stack between first connector 44 and second connector 44a. System 46 and stack 13 together define a fuel cell assembly 10. Incoming air 48 is introduced at a controlled volume flow by conventional flow control means such as a fan or compressor (not shown) and is passed through an air tempering device 50, shown as a cathode air heater in FIGS. 4a and 4b, by means of which the temperature of air 52 exiting device 50 may be controlled to a desired setpoint temperature.

A flow path selector 54, for example, a rotary four-port valve having ports A, B, C, and D connected to tempered air 52, input connector 44, output connector 44a, and exhaust 56, respectively, and responsive to conventional programmable control means 47, is shown in FIGS. 4a and 4b. Of course, other means for making and controllably selecting such connections as may occur to those of ordinary skill in the art are fully comprehended by the present invention. Selector 54 includes a shaped rotor 58 rotatably disposed in a housing 60 to form first and second chambers 59 and 61. Rotor 58 is capable of being rotated about an axis 62 between a first position as shown in FIG. 4a, wherein port A is connected to port B and port C is connected to port D, and a second position as shown in FIG. 4b, wherein port A is connected to port D and port B is connected to port C. With rotor 58 in the first position, tempered air 52 flows through stack 13 in a first direction from port 44 to port 44a and thence to exhaust 56; and in the second position in the reverse direction from port 44a to port 44 and thence to exhaust 56. To control the flow direction of the tempered air, control means 47 can be programmed to rotate rotor 58 in one direction or in either direction between the first position and the second position, and at varied duty cycles to achieve the desired fuel cell temperature.

By reversing the flow of air through SOFC 13 across the cathode surfaces thereof, and thereby alternating the effective supply and exhaust edges 39,43 of the cathodes, flow control system 46 prevents establishment of a significant and dangerous temperature difference between these edges.

It should be noted that air tempering device 50 may be programmed to do no tempering (i.e., turned off) and thus can supply ambient temperature air as well as heated air. Thus, tempering system 46 may be used both for heating of the SOFC during startup and for cooling of the SOFC during operation, and can make the transition from one mode to the other, all while minimizing thermal imbalances within the SOFC.

It should be further noted that preferably rotor 58 is rotated in only a single direction, either clockwise or counterclockwise, to simplify actuation mechanisms, and that non-50% duty cycles are fully comprehended by the invention.

As noted above, in prior art tempering, the vulnerability of the cathode to failure from thermal expansion imposes very modest limits on the temperature of the air which may be used to heat or cool the SOFC, i.e., $\Delta T<200°$ C. Improved control system 46 permits use of much greater $\Delta T$ values, the maximum permissible values for any given SOFC being readily determinable without undue experimentation. Higher permissible $\Delta T$ values confer two very important benefits over prior art systems, particularly for automotive uses wherein a fuel cell may be required to start repeatedly on short notice and wherein net electric output is critically important. First, warmup times from ambient temperatures may be significantly shortened. Second, parasitic electric losses may be reduced by providing heating and cooling air at substantially lower volume and higher $\Delta T$; hence, the size and power of the air blower may be reduced.

Rotor 58 may be alternated between the first and second positions on any desired periodicity. Preferably, the reversal frequency is selected to be relatively high with respect to the thermal time constant of the fuel cell (e.g., 2 Hz) but is low with respect to the time it takes for the flow to move from port A to port C. Preferably, multiple air volume changes occur between ports A and C between reversals of flow. Since flow reversal is fast with respect to the thermal time constant, the cell does not respond to the high gradients associated with much higher $\Delta T$ air, and thus a much smaller volume of much hotter or much cooler air can be used to heat or cool, respectively, the fuel cell more evenly. Temperature differences exceeding 200° C. may be employed without damage to the cathode.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A reversing-flow air tempering and supply system for supplying air from a source through air-flow passages of a fuel cell having first and second ports connected to the air-flow passages, comprising:
   a) means for receiving air from said source and tempering said air to a predetermined temperature; and
   b) flow-selection means for receiving tempered air from said tempering means and being connected across said first and second ports and being reversibly acting to direct said tempered air sequentially in periodically alternating directions through said air-flow passages between said first and second ports.

2. A system in accordance with claim 1 wherein said reversing action of said flow-selection means is programmable to occur at a predetermined periodicity.

3. A system in accordance with claim 2 wherein the frequency of said reversing is about 2 Hz.

4. A system in accordance with claim 1 wherein said air-flow passages are at a first temperature and wherein a temperature difference ($\Delta T$) is defined between said first temperature and said predetermined temperature.

5. A system in accordance with claim 4 wherein said predetermined temperature is higher than said first temperature, said system being in a heating mode with respect to said air-flow passages.

6. A system in accordance with claim 4 wherein said predetermined temperature is lower than said first temperature, said system being in a cooling mode with respect to said air-flow passages.

7. A system in accordance with claim 4 wherein said $\Delta T$ is greater than 200° C.

8. A fuel cell assembly comprising a fuel cell having first and second ports connected to air-flow passages therein and a reversing-flow air tempering and supply system connected across said first and second ports, said system including means for receiving air from a source and tempering said air to a predetermined temperature, and flow-selection means for receiving tempered air from said tempering means and being reversibly acting to direct said tempered air sequentially in periodically alternating directions through said air-flow passages between said first and second ports.

9. A fuel cell assembly in accordance with claim 8 wherein said fuel cell is a solid oxide fuel cell.

10. A motorized vehicle comprising a fuel cell assembly including a fuel cell having first and second ports connected to air-flow passages therein and a reversing-flow air tempering and supply system connected across said first and second ports, said system including means for receiving air from a source and tempering said air to a predetermined temperature, and flow-selection means for receiving tempered air from said tempering means and being reversibly acting to direct said tempered air sequentially in periodically alternating directions through said air-flow passages between said first and second ports.

11. A method for modulating temperature differences within a fuel cell having passages for flow of air across a cathode from a first edge to a second edge thereof, comprising the steps of:

a) providing air through said passages in a first direction from said first edge to said second edge for a first predetermined period of time; and, b) reversing said air flow direction to provide air through said passages in a second direction from said second edge to said first edge for a second predetermined period of time.

12. A method in accordance with claim 11 wherein said first period of time and said second period of time are the same.

13. A method in accordance with claim 11 wherein said first period of time and said second period of time are different.

14. A method in accordance with claim 12 wherein each of said first and second periods is about one-half second.

15. A method in accordance with claim 11 wherein said cathode is at a first temperature and wherein said provided air is at a second temperature, a temperature difference ($\Delta T$) existing therebetween.

16. A method in accordance with claim 15 wherein said $\Delta T$ exceeds 200° C.

* * * * *